(12) United States Patent
Eswaran et al.

(10) Patent No.: US 8,898,331 B2
(45) Date of Patent: Nov. 25, 2014

(54) METHOD, NETWORK AND COMPUTER PROGRAM FOR PROCESSING A CONTENT REQUEST

(75) Inventors: Anand Eswaran, Karnataka (IN);
Ravindra Guntur, Karnataka (IN);
Vijay Kannan, Karnataka (IN);
Venkatavaradhan Devarajan,
Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1706 days.

(21) Appl. No.: 11/855,119

(22) Filed: Sep. 13, 2007

(65) Prior Publication Data
US 2009/0019135 A1 Jan. 15, 2009

(30) Foreign Application Priority Data
Jul. 9, 2007 (IN) .......................... 1476/CHE/2007

(51) Int. Cl.
*G06F 15/173* (2006.01)
*H04L 29/12* (2006.01)
*H04L 12/46* (2006.01)
*H04L 29/08* (2006.01)

(52) U.S. Cl.
CPC ............ *H04L 12/4645* (2013.01); *H04L 61/30* (2013.01); *H04L 29/12028* (2013.01); *H04L 61/6022* (2013.01); *H04L 67/1002* (2013.01); *H04L 29/12839* (2013.01); *H04L 67/327* (2013.01); *H04L 29/12594* (2013.01); *H04L 67/1014* (2013.01); *H04L 61/103* (2013.01)
USPC ......................................................... 709/238

(58) Field of Classification Search
CPC ........................ H04L 12/4645; H04L 12/4675
USPC ........................ 709/226, 229, 201, 238, 245
See application file for complete search history.

(56) References Cited

U.S. PATENT DOCUMENTS

| | | | |
|---|---|---|---|
| 6,836,462 B1 * | 12/2004 | Albert et al. ................... | 370/235 |
| 6,891,839 B2 * | 5/2005 | Albert et al. ................... | 370/401 |
| 7,251,681 B1 * | 7/2007 | Gourlay ......................... | 709/214 |
| 7,404,012 B2 * | 7/2008 | Matters et al. ................. | 709/250 |
| 7,447,777 B1 * | 11/2008 | Singh Ahuja et al. ......... | 709/227 |
| 7,483,374 B2 * | 1/2009 | Nilakantan et al. ............ | 370/235 |
| 7,535,913 B2 * | 5/2009 | Minami et al. ................ | 370/401 |
| 7,545,748 B1 * | 6/2009 | Riddle ........................... | 370/235 |
| 7,593,400 B2 * | 9/2009 | Zelig et al. .................... | 370/389 |
| 2002/0010783 A1 * | 1/2002 | Primak et al. ................. | 709/228 |
| 2004/0068589 A1 * | 4/2004 | Witkowski et al. ........... | 709/249 |
| 2004/0210724 A1 * | 10/2004 | Koning et al. ................. | 711/153 |
| 2006/0080446 A1 * | 4/2006 | Bahl .............................. | 709/227 |

\* cited by examiner

*Primary Examiner* — Kristie Shingles

(57) ABSTRACT

The embodiments described herein provide a method, program and computing network for processing a content request received via a computing network. The method comprises the steps of receiving an incoming request for content from a remote computing device, determining the content type requested by the incoming request and delivering the request to one of a plurality of servers according to the determined content request type.

23 Claims, 4 Drawing Sheets

METHOD, NETWORK AND COMPUTER PROGRAM FOR PROCESSING A CONTENT REQUEST

BACKGROUND OF THE INVENTION

There is an increasing need to deliver large amounts of data across both private and public networks. This is particularly the case for delivery of data over the Internet, the largest single network in the world. Systems which are arranged to serve a large amount of data to a large amount of users require high availability, high scalability and robust load management in order to meet high user demands. For example, one data protocol commonly used to send data between computing systems is the Hypertext Transfer Protocol (HTTP). Systems utilising HTTP are generally termed "web-class systems", as HTTP is one of the principal protocols utilised to deliver a number of services colloquially known as "web" services. Other protocols are also used to deliver data between computing systems. Examples of data transfer (i.e. application layer) protocols include File Transfer Protocol (FTP), Real-time Streaming Protocol (RTSP) and Stream Control Transmission Protocol (SCTP).

While web-scale systems vary greatly in functionality, with applications ranging from search engines to media sites, many content hosting web-sites such as online stock trading, news sites, movie booking sites, etc., exhibit similar fundamental characteristics. That is, all of these systems are required to service a large amount of users. Moreover, the working set of content on a web server (e.g. the results of common searches, frequently accessed videos, frequently accessed web pages) commonly fits within the collective memory cache of the servers which house (and host) the content. Therefore, the traditional 'bottleneck' of a web-based system is not the disk access speed or CPU processing ability of the system, but the ability of the system to handle and process web-server requests.

BRIEF DESCRIPTION OF THE DRAWINGS

In order that the invention may be more clearly ascertained, embodiments will now be described, by way of example, with reference to the accompanying to drawings, in which.

DETAILED DESCRIPTION OF THE EMBODIMENTS

There is described herein a system, method and computer program for processing a content request received via a computing network.

In one embodiment, there is provided a method for processing a content request received via a computing network, comprising the steps of receiving an incoming request for content from a remote computing device, determining the content type requested by the incoming request and delivering the request to one of a plurality of servers according to the determined content request type.

In another embodiment, there is provided a computing network comprising a plurality of servers, wherein each of the plurality of servers is arranged to receive an incoming request for content from a remote computing device, and a processing arrangement configured to determine the content type requested and deliver the request to one of plurality of servers according to the content type request.

In another embodiment, there is provided a program for processing incoming content requests in a programmable device and comprising at least one instruction which, when implemented on a readable medium of the programmable device, causes the programmable device to implement the steps of receiving an incoming request for content from a remote computing device, determining the content type requested by the incoming request and delivering the request to one of a plurality of servers according to the determined content request type.

In more detail, the embodiment described herein describes a content-based Ethernet switching method and software application, where the decision to switch a request to a particular server in a plurality of inter-related servers is based on the content being sought by the request.

Figure 1:
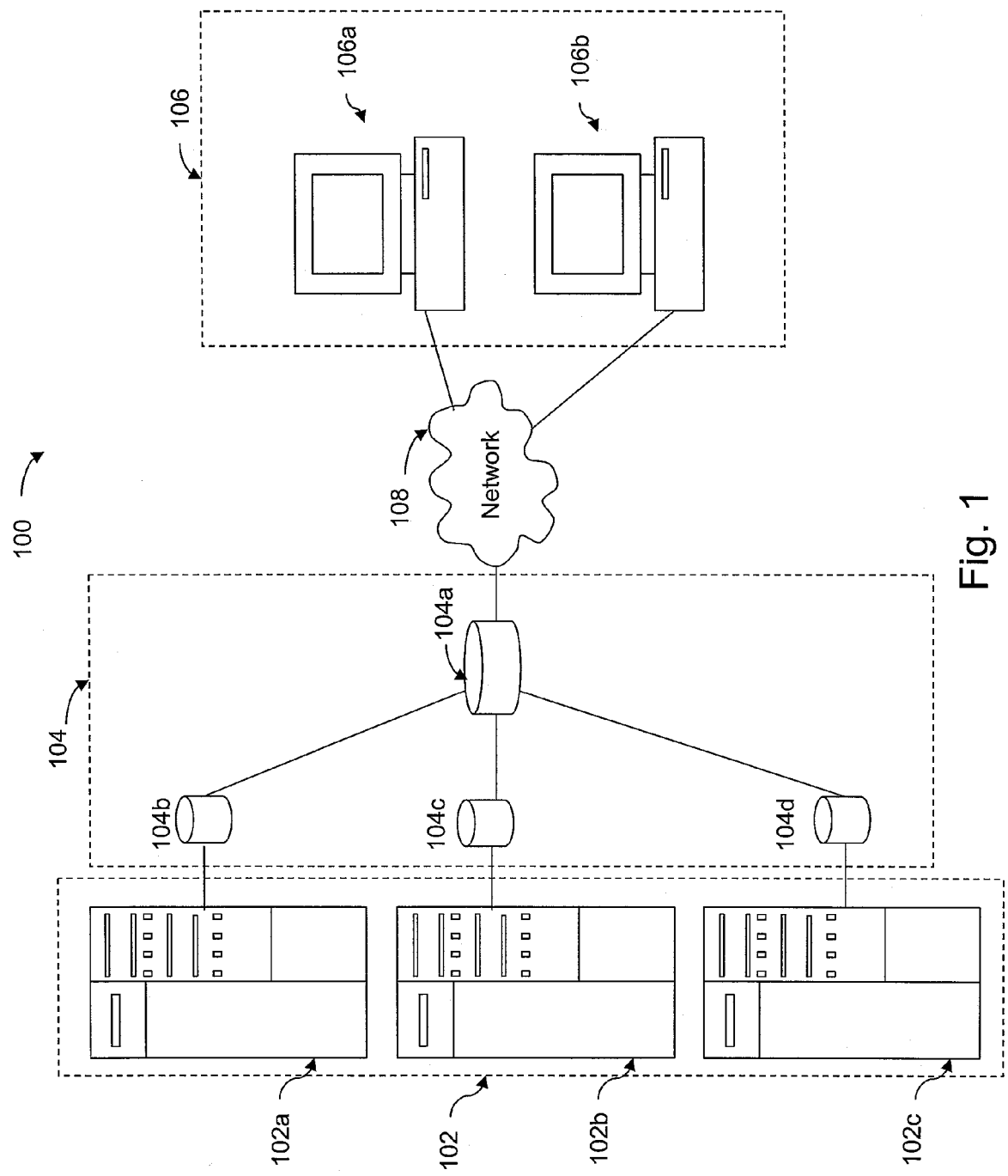
FIG. 1 is a schematic view of a computing network suitable for operating an embodiment of the present invention.

A system in accordance with an embodiment of the invention may be a computing network such as the exemplary network 100 illustrated in FIG. 1. In one embodiment, the computing network 100 comprises a server farm 102 (including a plurality of servers 102*a*, 102*b*, 102*c*, etc.) connected through a switching infrastructure 104 (including a plurality of switches arranged in a tree-like structure 104*a*, 104*b*, 104*c*, 104*d*, etc.), such that the switching infrastructure 104 may switch incoming requests to a relevant server in the server farm 102. Incoming requests are received from clients 106 via a network 108 in the form of the Internet. Clients 106 are in the form of personal computing devices 106*a*, 106*b* comprising standard hardware and software for communicating with the server farm 102. The clients 106 communicate with the server farm 102 (through the switching infrastructure 104) using the Transmission Control Protocol/Internet Protocol (TCP/IP) suite of protocols, which are used, in the embodiment described herein, to send HTTP requests from the clients 106 to the server farm 102. The switching infrastructure 104 is capable of Media Access Control (MAC) address lookups and Virtual Local Area Network (VLAN) based switching.

Figure 2:
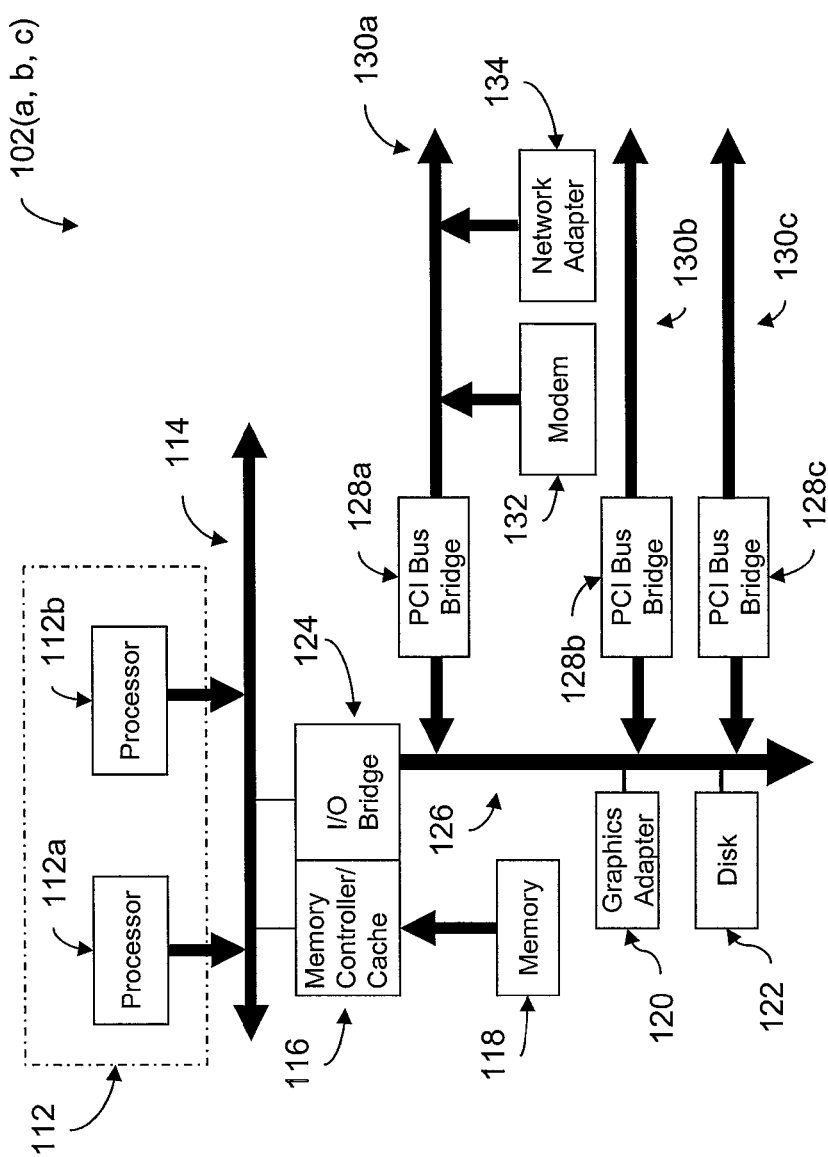
FIG. 2 is a block diagram showing the internal components of a server, in which embodiments of the present invention may be implemented.

With reference to FIG. 2, there is shown a block diagram of the hardware and software of an example server 102(*a, b, c*) in the server farm 102, which in the embodiment disclosed herein is a HP-UX rx5670 server available from the Hewlett Packard Company. The server runs an operating system in the form of a Linux operating system 132. It should be noted that, although in this embodiment the server implements a Linux operating system 132, other embodiments can include different operating systems such as, for example, the UNIX operating system. The Linux operating system includes a file system having software for controlling the transfer of data between the network 108 (Internet) and hard disk 122. A buffer cache composed of part of memory 118 is used as a buffer for data transfer. The buffer cache is also arranged to hold the contents of disk blocks for the purpose of reducing frequent high latency disk I/Os.

The server 102 further includes a number of processors 112 in the form of two Intel Itanium 2 processors 112*a*, 112*b* (available from Intel Corporation of The United States of America) coupled to a system bus 114. A memory controller/cache 116 is also coupled to the system bus 114 and is arranged to interface the memory 118, which is in the form of double data rate DDR SDRAM. Also provided is a graphics adapter 120 for handling high speed graphic addressing and an ATA gigabyte hard disk 122 which are connected to an I/O bus bridge 124, by way of an I/O bus 126. The memory controller 116 and I/O bus bridge 124 may be interconnected, as shown in FIG. 2. The memory 118 and hard disk 122 are examples of processor-readable storage media.

Connected to the I/O bus 126 are PCI bus bridges 128a, 128b, 128c, which provide an interface to devices connected to the server 102 via PCI buses 130a, 130b, 130c. A modem 132 and network adapter 134 are coupled to PCI bus 130a. The network adapter 134 is configured to allow the server 102 to exchange data with clients 106 using the TCP/IP protocol. The server 102 can interact with clients 106 through a switch infrastructure 104. As will be appreciated by a person skilled in the art, additional I/O devices such as a CD-ROM, may be coupled to the server 102 via I/O busses 130a, 130b, 130c. The example HP server 102 utilizes the Linux Operating system (including Linux Kernel v2.6).

A series of HP ProCurve™ Series 2500 Networking switches are utilized for the switches 104(a, b, c, d) which form switching infrastructure 104. The switches 104 (a, b, c, d) are arranged in a tree-like structure, such that requests received via the network 108 can be switched to the correct server in the server farm 102. In the example of FIG. 1, switch 104a is termed the 'front-end' switch, as it is the switch which initially receives a request from the network 108.

It will be understood that the network 100, server farm 102, switching infrastructure 104, clients 106 and network 108 described above are exemplary only, and variations and modifications to the network, server farm, switching infrastructure, client devices and network are within the purview of a skilled addressee.

In the embodiment described herein, clients 106 use the HTTP protocol for retrieving documents/files of interest. Prior to the HTTP request packet arriving at a server in the server farm 102, a TCP connection needs to be established between the client 106 and a website (hosted on one of the servers 102a, 102b, 102c, etc.). In a situation where a large number of concurrent TCP connections are required, a layer-7 content router (not shown) may be inserted into the front-end of the network (i.e. between the front-end switch 104a and the network 108). It will be understood that the use of TCP-accelerator based layer-7 switches can be utilised to improve overall system throughput by providing wire-speed TCP connection handling and optimized connection handover.

Upon the receipt of HTTP packets (which in turn are embedded into Ethernet packets) from the client 106, the front-end switch 104a (i.e. the switch (or switches) that interface directly with the network 108) applies a hash function on the URL portion of the HTTP packet. The application of a hash function transforms the URL portion of the HTTP packet into a 60-bit hash value that serves as an Object Identifier (OID). The Object Identifier field includes two parts:

1. the first identifier is 12 bits long and is used as a Content Virtual Local Area Network Identifier (C-VID); and
2. the second identifier is 48 bits long and is used as a Content Media Access Control Identifier (C-MAC).

Based on the object identifier derived from the incoming URL, the TCP connection is handed off by the switching infrastructure 104 to one of the servers in the server farm 102. In other words, the unique OID generated by a front-end switch 104a is embedded into the existing Ethernet header of the incoming packet and is used to switch the packet through the switching infrastructure 104 to a relevant server.

The manner in which the hash identifier is used to switch the packet is now described in more detail. The Ethernet frame which propagates the request through the switching infrastructure 104 is modified such that the destination MAC address field of the Ethernet frame is populated with the 48-bit C-MAC identifier while the 12-bit VLAN identifier field is populated with the C-VID identifier. As the object identifiers are not unique, the packet is encapsulated into the Ethernet frame. This allows the Ethernet frame to be switched as it is passed from one switch to another.

For the C-MAC and C-VID identifiers to be meaningful, each server 102a, 102b, 102c, etc., in the server farm 102 must be allocated or identified by a unique C-VID which equals the 12-bit prefix of the OID range. The manner in which C-VID are allocated is arbitrary, as chosen by a system administrator or by an algorithm. For example, each C-VID may be allocated equally amongst each server in the server farm, or weighting factors may also be used.

Moreover, on each switch of the network, the ports of each switch are tagged with all server C-VIDs that can be reached from that port. This is achieved through a protocol where each server propagates its C-VID by sending a packet through the network. Each switch tags the port on which it receives the packet to that particular VLAN. Given that the network is organized as a tree with servers in the leaf nodes, the requests are switched from the front-end switch using a VLAN tag switching scheme where packets are switched on the C-VID portion of the 60-bit hash value generated by the front end switch.

By iteratively broadcasting the packets on the output port tagged to the C-VID at each switch from the root to the server, the destination server is reached. This obviates the need for MAC-look-up based switching. However, if such a scheme is used exclusively, the identifiers of content objects are statically associated with particular servers and data cannot be moved dynamically between servers. This interferes with the ability of the server farm to load balance, as servers with a lower load cannot receive and serve content which is not ascribed to them.

However, dynamic load sharing is possible where each of the switches utilize MAC tables. Whenever a switch receives a packet with a source MAC address that is not recognised, it maps that MAC address to the input port on which the packet was received. Subsequent packets destined to that particular MAC address are automatically sent out on that port alone, thus preventing broadcasts.

Therefore, MAC tables can be utilised to perform load balancing in the network. Combining VLAN tag-switching with MAC table look-ups allows for "opportunistic tag switching". That is, when content is moved to another server or the surrogate server for that content intends to serve requests, the MAC tables of all switches in the path from the common ancestor of the default server all the way down to the surrogate server are populated with the C-MAC object identifier and the MAC table entry can be used to switch the packet to the correct server. This allows a limited number of files to be served by surrogate servers in the system, with the limit being a function of the MAC table size of the switches.

Figure 3:
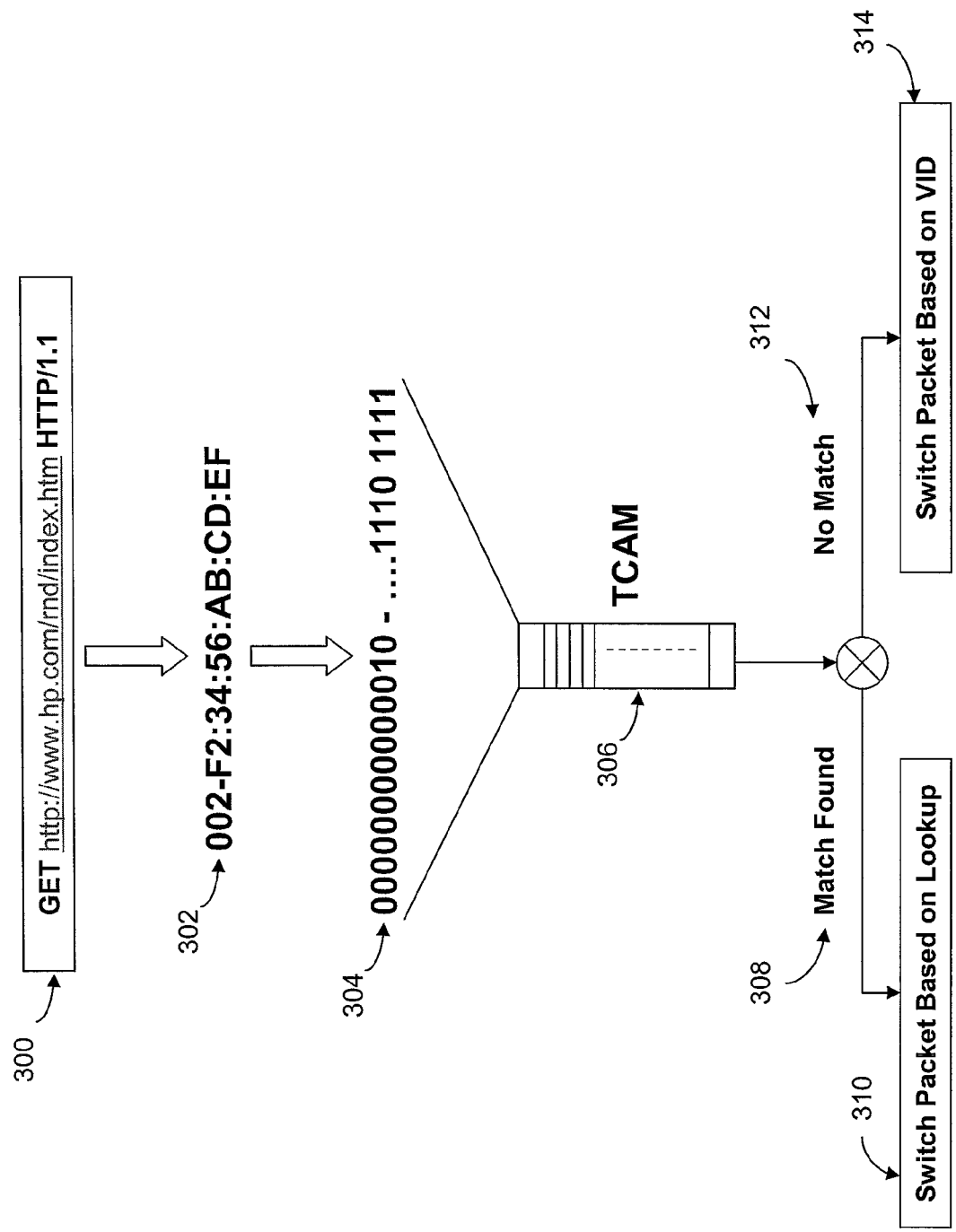
FIG. 3 is a block diagram of a method in accordance with an embodiment of the present invention.

The protocol for content-switching based on an example 60-bit object identifier is shown in FIG. 3. At step 300, the URL (encapsulated in a HTTP packet, for example) is received by the front-end switch. The front-end switch converts the URL to a 60-bit hash (step 302) containing 002 as the C-VID and F2:34:56:AB:CD:EF as the C-MAC. At step 304, the hash is converted into binary, and is compared to the MAC table at step 306 to determine whether a match can be found. If, at step 308, a match is found, the packet is switched (step 310) according to the C-MAC in the MAC table. If however, at step 312, no match is found, the packet is switched and according to the C-VID value.

Figure 4:
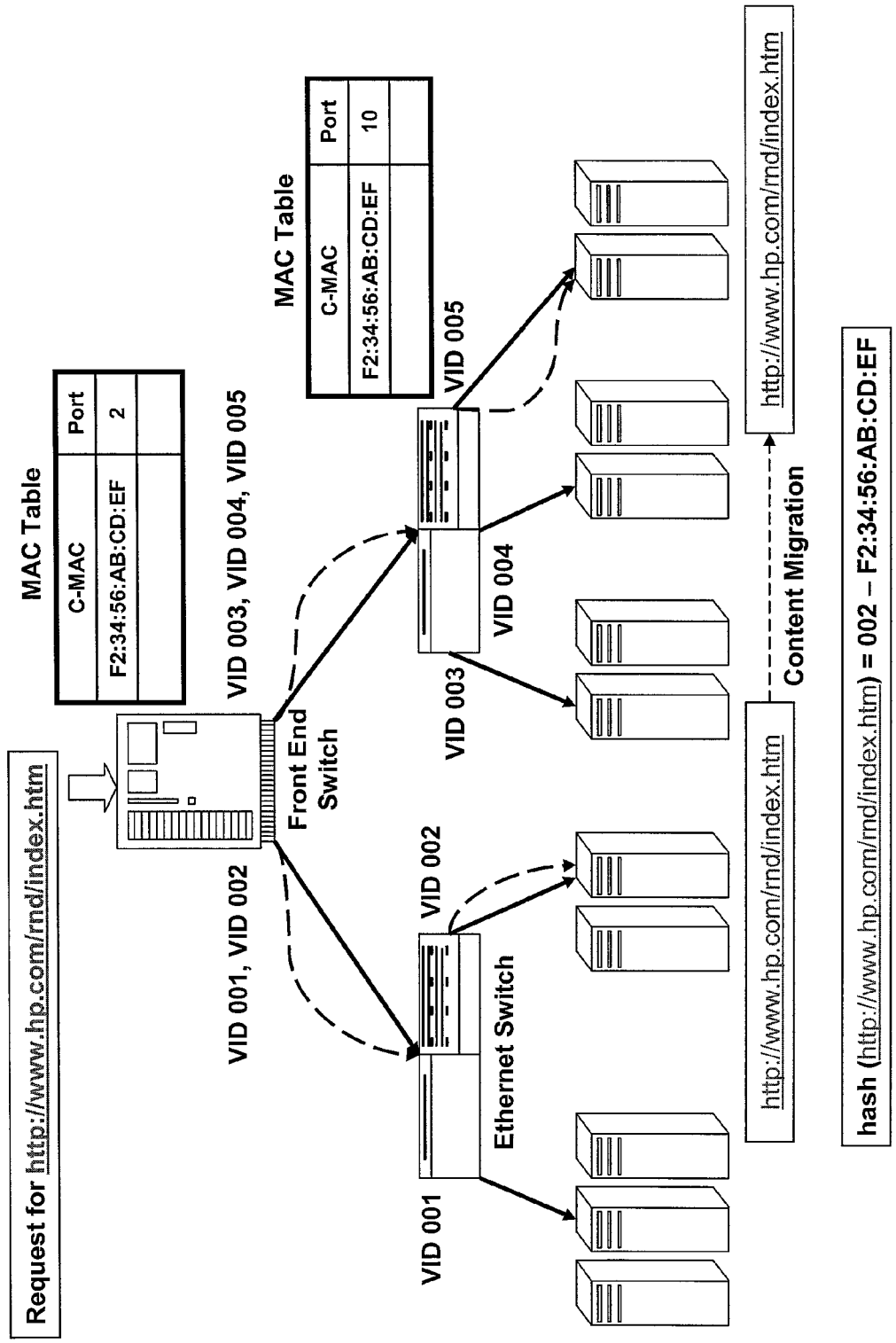
FIG. 4 is a flow diagram of a method in accordance with an embodiment of the present invention.

FIG. 4 provides a worked an example of the embodiment described above. The URL www.hp.com/rnd/index.htm is a particular file requested using HTTP. The 60-bit hash, generated from the URL portion of the HTTP request, is 002-F2:34:56:AB:CD:EF. In the default case, the C-VID portion of the hash, which is 002, corresponds to the server with the same object ID (as shown in FIG. 4). Hence, when a request for the URL www.hp.com/rnd/index.htm is received, the packet from the switch is switched to the server on the dotted path. This is due to the fact that a MAC address look-up based on content will fail and hence the C-VID portion of the hash, namely 002, is used to tag-switch the packet.

However, in another example, the file is switched to a new surrogate server which is on VLAN-ID equal to 005 as shown in the FIG. 4. Thus all MAC tables of all switches in the path from the common ancestor of the default server to the surrogate server are populated with the C-MAC entry F2:34:56:AB:CD:EF as shown in FIG. 4. This is achieved using a protocol that reprograms the MAC tables of all switches from the common ancestor down to the surrogate switch with the OID to port mappings.

In the example, the surrogate server sends a packet through the network, the packet having a VLAN-ID equal to 005 and a MAC address equal to the value F2:34:56:AB:CD:EF. As the packet passes through the switch infrastructure, the MAC address is filled into the MAC tables of each switch until the front-end switch is reached. The algorithm that is implemented on each switch is given below.
1. If the destination object identifier (in the destination MAC field) is present in the MAC table, switch to output port corresponding to that object identifier. The MAC table stores a mapping between the C-MAC and port number and C-VID is ignored; otherwise
2. Switch based on the C-VID bits of the object identifier.

The embodiment also provides a Content Relocation Protocol, as outlined below.
Current Server Side Protocol:
1. Use an appropriate algorithm (such as a load balancing algorithm) to locate a new owner server. Copy the desired content from a current owner server to the new owner server;
2. Determine the common ancestor switch of the current owner server and the new owner server; and
3. Send a packet to the common ancestor switch asking the switch to repopulate entries in the switching path to the new owner.
Switch Side Protocol:
1. Add a new entry to the MAC table that contains the object identifier and the output port that leads to the new owner; and
2. Send a packet to the child switch that leads to the new owner server.

Each switch repeats the switch side protocol, thus populating the new mapping of the content to all switches on the path from the common ancestor switch to the new owner.

Since the fast path switching does not distinguish between content Ethernet frames and normal Ethernet frames, conventional Ethernet packets destined to the host MAC address can be used to copy the contents of files to the new server. These conventional packets are tag-switched to the new server and the receiver side stack determines whether the destination MAC was an object identifier or a MAC address. Object identifiers that conflict with server MAC addresses cannot be relocated to other servers and are pinned to the server with MAC address that match their object ID.

The server that hosts content consists of a full-fledged networking stack that operates in promiscuous mode, as the network ensures that all packets that reach the server are indeed destined to that server. Where requests arrive over TCP, a kernel hook module in the server inspects incoming content Ethernet frames, extracts the TCP session parameter and subsequently creates a TCP connection to handle the content flow. The packet is then delivered to the front-end switch, which can include acceleration hardware to translate the IP address of the server to that of the front-end switch, thus anonymizing the IP address of the server. The packet is subsequently routed out of the network and to the client.

Although not required, the embodiments described with reference to FIGS. 3 and 4 can be implemented via an application programming interface (API), for use by a developer, or can be implemented as code within another software application. Generally, as software applications include routines, programs, objects, components, and data files that perform or assist in the performance of particular functions, it will be understood that a software application may be distributed across a number of routines, objects and components, but achieve the same functionality as the embodiment and the broader invention claimed herein. Such variations and modifications would be within the purview of those skilled in the art.

The foregoing description of the exemplary embodiments is provided to enable any person skilled in the art to make or use the present invention. While the invention has been described with respect to particular illustrated embodiments, various modifications to these embodiments will be readily apparent to those skilled in the art, and the generic principles defined herein may be applied to other embodiments without departing from the spirit or scope of the invention. For example, the embodiment described herein may be implemented in any one of a variety of web-class systems that have significantly different business models/business flow patterns and may be utilised with any suitable protocol.

It is therefore desired that the present embodiments be considered in all respects as illustrative and not restrictive. Accordingly, the present invention is not intended to be limited to the embodiments described above but is accorded the wider scope consistent with the principles and novel features disclosed herein.

The invention claimed is:

1. A method for processing a content request received via a computing network, comprising:
receiving an incoming request for content from a remote computing device;
determining a content type requested by the incoming request, wherein determining the content type comprises generating, by at least one processor, an object identifier by applying a function on a portion of the incoming request; and
delivering the request to one of a plurality of servers according to the object identifier, wherein the object identifier has a first portion and a second portion, wherein the first portion allows a first technique of delivering the request to one of the plurality of servers, and the second portion allows a second, different technique of delivering the request to one of the plurality of servers, wherein the second technique of delivering the request supports dynamic association of the content among the plurality of servers.

2. A method in accordance with claim 1, wherein applying the function on the portion of the incoming request comprises applying the function on a uniform resource locator of the incoming request to generate the object identifier.

3. A method in accordance with claim 1, wherein the first portion of the object identifier includes a VLAN identifier corresponding to a Virtual Local Area Network (VLAN), and the second portion of the object identifier includes a MAC identifier corresponding to a Media Access Control (MAC) address.

4. A method in accordance with claim 3, wherein delivering the request to one of the plurality of servers further comprises determining whether the MAC identifier is locatable in a MAC table, and forwarding the request to an output port indicated by the MAC table and corresponding to the MAC address if it is determined that the MAC identifier is locatable in the MAC table and otherwise forwarding the request to a server associated with the VLAN identifier if it is determined that the MAC identifier is not locatable in the MAC table.

5. A method in accordance with claim 4, further comprising:
   relocating particular content from a first one of the plurality of servers to a second one of the plurality of servers by transferring the particular content to the second server,
   determining a common ancestor switch of the first server and the second server in a switching infrastructure, and
   sending a request to the common ancestor switch to update the MAC table.

6. A method in accordance with claim 5, further comprising the common ancestor switch sending a request to each child switch to update a MAC table of each child switch.

7. A method in accordance with claim 4, further comprising:
   associating each one of a plurality of servers with a unique VLAN identifier; and
   passing the request through a switching infrastructure comprising a plurality of switches arranged in a tree-like configuration, wherein one or more of the plurality of servers are located at leaf nodes of the tree-like configuration.

8. A method in accordance with claim 7, wherein the unique VLAN identifier of each of the one or more of the plurality of servers located at the leaf nodes of the switching infrastructure is passed to a particular one of the switches, such that each port of the particular switch is associated with the one or more VLAN identifiers received at the port.

9. A method in accordance with claim 8, further comprising, on determining that the MAC identifier is not locatable in the MAC table, mapping the MAC address to the input port on which the request was received.

10. A computing network, comprising:
    a plurality of servers having corresponding processors, wherein each of the plurality of servers is arranged to process an incoming request for content from a remote computing device; and
    a processing arrangement configured to:
       receive the incoming request for the content;
       generate an object identifier by applying a function on a portion of the incoming request; and
       deliver the request to one of the plurality of servers according to the object identifier, wherein the object identifier has a first portion and a second portion, wherein the first portion allows a first technique of delivering the request to one of the plurality of servers, and the second portion allows a second, different technique of delivering the request to one of the plurality of servers, wherein the second technique of delivering the request supports dynamic association of the content among the plurality of servers.

11. A computer network in accordance with claim 10, wherein the portion of the incoming request on which the function is applied is a uniform resource locator.

12. A computer network in accordance with claim 10, wherein the function is a hash function applied on the portion of the incoming request to generate the object identifier.

13. A computer network in accordance with claim 12, wherein the portion of the incoming request on which the hash function is applied includes a uniform resource locator.

14. A computing network in accordance with claim 10, wherein the first portion of the object identifier includes a VLAN identifier corresponding to a Virtual Local Area Network (VLAN), and the second portion of the object identifier comprises a MAC identifier corresponding to a Media Access Control (MAC) address.

15. A computing network in accordance with claim 14, wherein the processing arrangement is configured to determine whether the MAC identifier is locatable in a MAC table, forward the request to an output port identified by the MAC table and corresponding to the MAC address if it is determined that the MAC identifier is locatable in the MAC table, and otherwise forward the request to a server associated with the VLAN identifier if it is determined that the MAC identifier is not locatable in the MAC table.

16. A computing network in accordance with claim 15, wherein when particular content of a first one of the plurality of servers is relocated to a second one of the plurality of servers by transferring the particular content to the second server, the processing arrangement is further configured to determine a common ancestor switch of the first server and the second server in a switching infrastructure, and to send a request to the common ancestor switch to update the MAC table.

17. A computing network in accordance with claim 16, wherein the common ancestor switch is configured to send a request to each child switch to update a MAC table of each child switch.

18. A processor-readable storage medium storing a program for processing incoming content requests in a programmable device and comprising instructions which when executed cause at least one processor in the programmable device to implement the steps of:
   receiving an incoming request for content from a remote computing device;
   generating one object identifier by applying a function on a portion of the incoming request; and
   delivering the request to one of a plurality of servers according to the object identifier, wherein the object identifier has a first portion and a second portion, wherein the first portion allows a first technique of delivering the request to one of the plurality of servers, and the second portion allows a second, different technique of delivering the request to one of the plurality of servers, wherein the second technique of delivering the request supports dynamic association of the content among the plurality of servers.

19. A method in accordance with claim 1, wherein applying the function comprises applying a hash function on the portion of the incoming request to generate the object identifier.

20. A method in accordance with claim 19, wherein applying the hash function on the portion of the incoming request comprises applying the hash function on a uniform resource locator of the incoming request to generate the object identifier.

21. A processor-readable storage medium in accordance with claim 18, wherein applying the function comprises applying a hash function on the portion of the incoming request to generate the object identifier.

22. A processor-readable storage medium in accordance with claim 18, wherein applying the function on the portion of the incoming request comprises applying the function on a uniform resource locator of the incoming request to generate the object identifier.

23. A processor-readable storage medium in accordance with claim 18, wherein the first portion is a VLAN (Virtual Local Area Network) identifier and the second portion is an address, wherein the instructions which when executed cause the at least one processor to further:
    determine whether the address of the object identifier is present in an address table that maps addresses to ports;
    in response to determining that the address of the object identifier is present in the address table, forward the request to a corresponding port identified by the address table; and
    in response to determining that the address of the object identifier is not in the address table, forward the request according to the VLAN identifier.

\* \* \* \* \*